US006905280B2

United States Patent
Brunner et al.

(10) Patent No.: US 6,905,280 B2
(45) Date of Patent: Jun. 14, 2005

(54) APPARATUS AND METHOD FOR SECURING A HUB TO A ROTATABLE SHAFT

(75) Inventors: Dennis J. Brunner, Rochester, NY (US); Joseph D. Godsey, Lima, NY (US)

(73) Assignee: Delphi Technologies, Inc., Troy, MI (US)

( * ) Notice: Subject to any disclaimer, the term of this patent is extended or adjusted under 35 U.S.C. 154(b) by 31 days.

(21) Appl. No.: 10/044,466

(22) Filed: Jan. 10, 2002

(65) Prior Publication Data

US 2003/0129023 A1 Jul. 10, 2003

(51) Int. Cl.[7] ................................................. B25G 3/28
(52) U.S. Cl. ....................... 403/358; 403/355; 403/356; 403/359.6; 464/182
(58) Field of Search ................................. 403/355–358, 403/359.6, 359.1; 73/494, 865.9; 464/182, 34, 130, 30; 285/91, 382, 382.1

(56) References Cited

U.S. PATENT DOCUMENTS

| | | | | |
|---|---|---|---|---|
| 1,221,709 A | * | 4/1917 | Dyett | 403/355 |
| 1,560,399 A | * | 11/1925 | Preston, Sr. | 403/279 |
| 1,866,112 A | * | 7/1932 | Kindelmann et al. | 403/358 |
| 4,929,118 A | * | 5/1990 | Anderson | 403/356 |
| 5,688,070 A | * | 11/1997 | Morelli et al. | 403/356 |

FOREIGN PATENT DOCUMENTS

GB          2 066 927    *  7/1981  ................. 403/356

* cited by examiner

Primary Examiner—Daniel P. Stodola
Assistant Examiner—Michael P. Ferguson
(74) Attorney, Agent, or Firm—Patrick M. Griffin

(57) ABSTRACT

Apparatus and method for rotationally immobilizing a hub on a rotatable shaft. A portion of the shaft is cylindrical and has a first diameter. The hub has a cylindrical axial bore having a second diameter larger than the diameter of the shaft. At least one axially-extending keyway is provided in the surface of the shaft. When the shaft is inserted into the hub bore, the hub is free to rotate upon the shaft. To immobilize the hub rotationally with respect to the shaft, at least one tapered key having a height greater than the maximum depth of the at least one keyway is inserted axially into the at least one keyway. Preferably, the at least one key is inserted along the at least one keyway to a point at which the maximum height of the at least one key is positioned at the axial midpoint of the hub bore. Preferably, the hub is formed of a deformable material and the at least one key is formed of a harder material and is provided with at least one relatively sharp edge such that the at least one key incises the hub bore as it moves along the at least one keyway, thus rigidly locking the hub to the shaft. The invention is especially useful in indexing a throttle position sensor to a throttle shaft.

11 Claims, 2 Drawing Sheets

Figure 1:
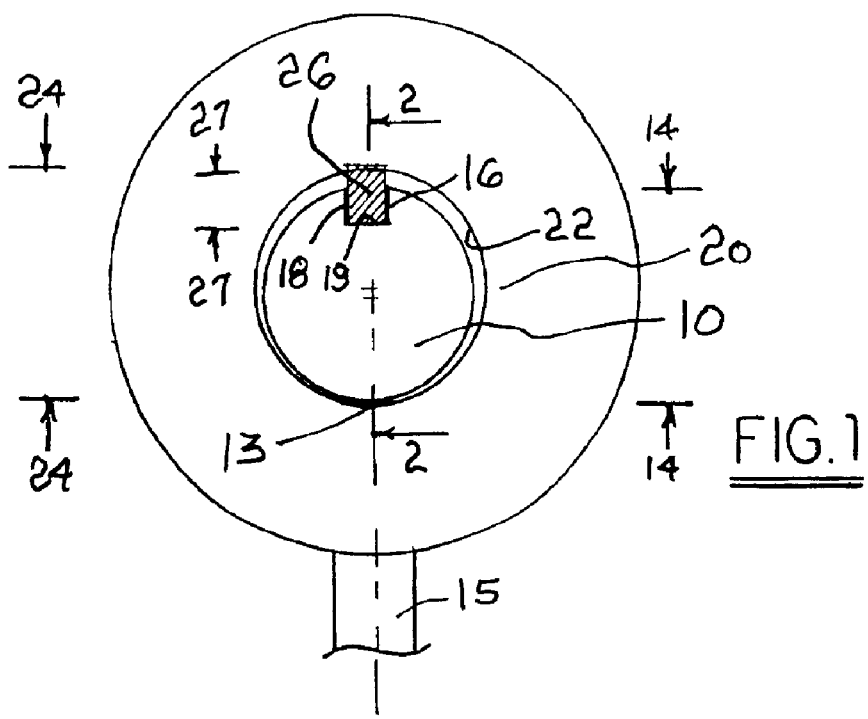

APPARATUS AND METHOD FOR SECURING A HUB TO A ROTATABLE SHAFT

TECHNICAL FIELD

The present invention relates to apparatus and method for securing a hub to a rotatable shaft; more particularly, to such apparatus and method wherein the hub must first be free to rotate on the shaft to permit rotational indexing of the hub to the shaft and then must be secured to the shaft without altering the indexing; and most particularly, to apparatus and method for securing a throttle position sensor to a throttle shaft after the throttle rotary position and the sensor are independently calibrated and the sensor is thus indexed to the position of the throttle shaft.

BACKGROUND OF THE INVENTION

In the automotive art, it can be desirable to monitor the rotary position of an engine throttle shaft as an input operating parameter to an engine control module. In the prior art, typically the lever arm of a variable-voltage sensor has a hub having an axial bore including an internal flat that is slipped onto the end of a throttle shaft provided with a mating external flat, such that the hub, once installed onto the shaft, cannot rotate independently of the shaft. Typically, the mating of the hub to the shaft is deliberately slightly loose to facilitate assembly and to allow for stack-up of manufacturing variances in the various components. In modern engine control, however, the resulting rotational play between the hub and the shaft can be unacceptably large, leading to imprecise determination of the actual position of the throttle shaft and hysteresis in the control loop.

A further disadvantage of this connecting scheme is that the rotary relationship between the throttle shaft and the sensor is fixed for all throttle shafts and sensors by the design placement of the flats and does not allow for individual, independent calibration of throttle flow and sensor output on any given engine prior to fixing the rotary relationship between the shaft and the sensor.

It is highly desirable to be able to set the throttle position at a predetermined air flow and to independently set the sensor at a predetermined output after the sensor hub has been slipped onto the throttle shaft, and then to immobilize the indexed relationship by securing the sensor hub to the throttle shaft. Such immobilization by prior art means can be expensive, as in for example the case of laser welding or a set screw or adhesives, and/or can jeopardize the delicate rotary relationship just established, as in the case of staking or crimping of the hub onto the shaft.

Therefore, there is a strong need for a simple, inexpensive, reliable means for immobilizing a hub onto a shaft without inducing rotational forces therebetween, while previously allowing relative rotary motion therebetween as may be necessary to index the hub to the shaft.

It is a principal object of this invention to provide an improved apparatus for immobilizing a hub onto a rotatable shaft without inducing rotational forces therebetween, to cause fixed rotation of the hub and shaft together, while allowing relative rotational motion therebetween prior to such immobilizing, as may be necessary to index the hub to the shaft.

SUMMARY OF THE INVENTION

Briefly described, the present invention is directed to an improved apparatus for rotationally immobilizing a hub on a rotatable shaft. The portion of the shaft for receiving the hub is cylindrical and has a first outer diameter. The hub has an axial, cylindrical bore having a second diameter larger than the diameter of the shaft over an axial width of the hub. An axially-extending keyway is provided in the shaft in the hub-receiving region. When the hub-receiving region of the shaft has been inserted into the hub axial bore, the hub is free to rotate upon the shaft. To immobilize the hub rotationally with respect to the shaft, a tapered key having a height greater than the depth of the keyway is inserted axially into the keyway as a radial jam fit against the hub. Preferably, the key is inserted to a point at which the maximum height of the key is positioned at the axial midpoint of the hub bore. Preferably, the hub is formed of a deformable polymer and the key is formed of a hard substance, such as metal, and is provided with at least one relatively sharp corner such that the key incises the hub bore as it moves along the keyway, thus rigidly locking the hub to the shaft.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 1 is a cross-sectional view of a shaft, hub, and locking key in accordance with the invention;

FIG. 2 is a cross-sectional view of the apparatus shown in FIG. 1, taken along line 2—2 in FIG. 1;

FIG. 3 is a view like that shown in FIG. 2 of an alternative embodiment of the invention; and FIG. 4 is an elevational view of a chain of locking keys in accordance with the invention.

DESCRIPTION OF THE PREFERRED EMBODIMENTS

Referring to FIGS. 1, 2, and 4, a rotatable shaft 10 has a cylindrical portion 12 having a first diameter 14. Portion 12 is provided with an axially-extending slot or keyway 16 having preferably a rectangular cross-sectional profile and having a wall depth 18 extending from the surface of portion 12 to the bottom 19 of keyway 16.

Hub 20 is provided with an axial bore 22 having a second diameter 24 greater than first diameter 14 and an axial length 25 less than the axial length of shaft portion 12 such that portion 12 may be inserted into bore 22. (Note: the difference between diameters 14 and 24 need be only a few thousandths of an inch, and are shown exaggerated for clarity in FIG. 1) Hub 20 is free to rotate about shaft portion 12. When hub 20 is urged radially against shaft portion 12 at a point 13 on the shaft diametrically opposite from keyway 16, a maximum radial distance 27 is established between keyway bottom 19 and the adjacent wall portion of bore 22.

Locking key 26 is substantially rectangular in cross-sectional profile and is formed to be substantially full-fitting in keyway 16. Key 26 is tapered longitudinally from a first portion 28 having a height less than distance 27 to a second portion 30 having a height at high point 31 slightly greater than distance 27. Either hub 20 or key 26 is formed of a deformable material, such as a polymer. In a currently preferred embodiment, the hub is more deformable than the key. With hub 20 rotatably mounted on shaft portion 12, key 26 is forced into keyway 16 with high point 31 adjacent hub 20, thereby causing either hub 20 or key 26 to become slightly deformed to accommodate a jam fit therebetween. All forces therebetween will be seen to be only radial, and therefore there is no tendency to shift the rotational relationship between the hub and the shaft during insertion of key 26 into keyway 16. Note: During insertion (assembly) of the key into the keyway, the hub and the shaft must be fixed axially so as to prevent any movement of the hub relative to the shaft. Typically, this can be accomplished by having a shoulder 17 on the shaft against which the hub will rest and the shaft will have a tool backup (stop) to maintain its position axially, thus opposing the friction force created when the key is pressed into the keyway.

In a currently preferred embodiment, shaft 10 is formed of metal, hub 20 is formed of a deformable composite polymer, and key 26 is formed of metal as by stamping or by molding of other hard material such as glass, ceramic, or mineral-filled polymer composite. The stamping process beneficially provides key 26 with at least one relatively sharp corner at high point 31, which corner incises the wall portion of bore 22 and thereby serves to rotationally lock hub 20 with respect to key 26, and therefore, to shaft 10. Preferably, both corners of high point 31 so incise the hub. Preferably, key 26 is urged into hub 20 until high point 31 coincides with the axial midpoint of bore 22, thus causing the portion of shaft 12 opposite keyway 16 to be firmly engaged with the wall of bore 22 along the entire axial length of bore 22. Preferably, hub 20 is formed to be diametrically deformable by insertion of key 26, such that bore 22 is urged to be slightly out-of-round, thereby holding key 26 firmly in place by radial restoring force of the hub exerted on the key and keyway.

Figure 4:
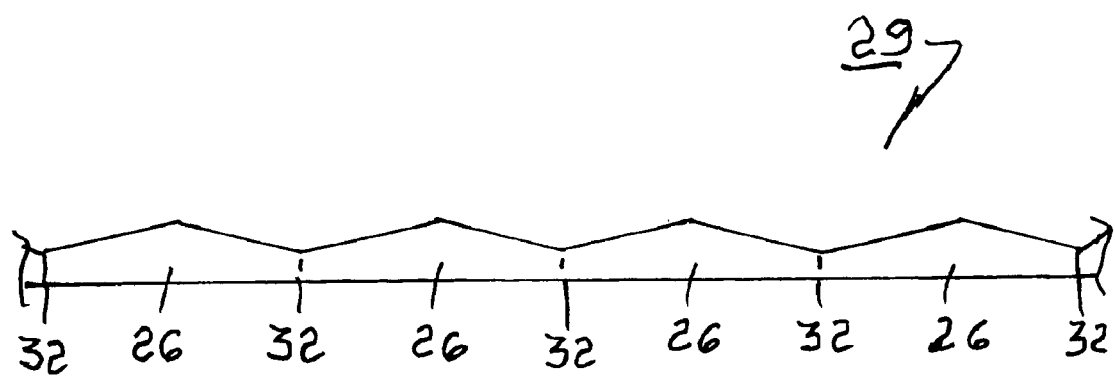

Referring to FIG. 4, if desired, key 26 may be readily formed as one of a chain 29 of keys which may be sequentially inserted into a plurality of keyways on a manufacturing assembly line and individually severed along break-line 32 from the chain after being inserted. Each severed key is not readily removed from its destination keyway and is thus tamper-proof.

Figure 2:
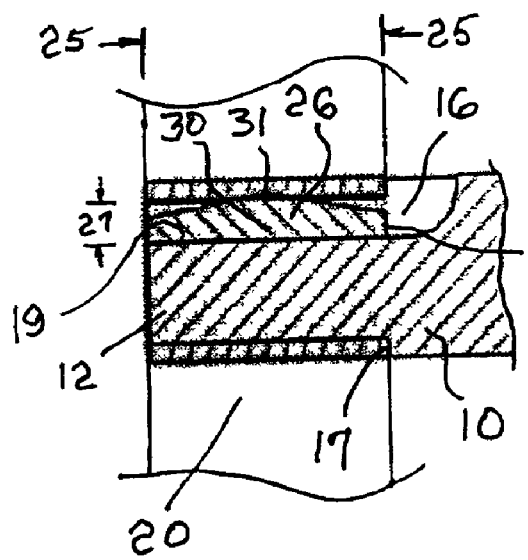
Figure 3:
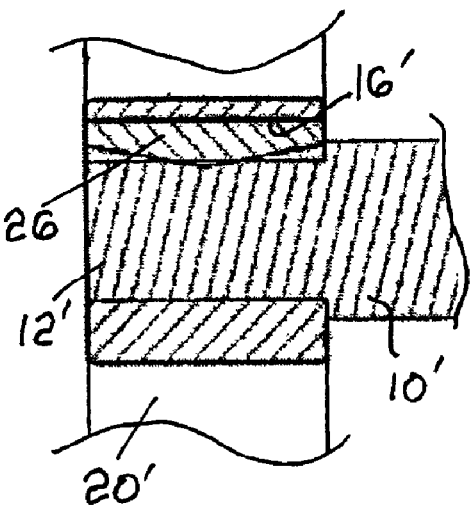

Key 26 may be formed in various tapered shapes and preferably in the "gable" shape shown in FIGS. 2 through 4, which is a double-ended wedge, such that the key may be inserted from either end of the key and therefore requires no specific orientation.

In an examplary automotive application of the invention, shown in FIG. 1, shaft 10 is a conventional throttle shaft of a conventional throttle valve. Shaft 10 is provided with a keyway 16, and the sensing arm 15 of a conventional throttle shaft variable-voltage position sensor (not shown) is provided with a bored hub 20. During assembly, the hub is installed onto the throttle shaft. The throttle shaft is then rotated on a test bed (not shown) to open the throttle valve until a predetermined calibration airflow through the throttle valve is obtained. Independently, the hub 20 is rotated on the calibrated shaft until a predetermined calibration output is obtained from the position sensor. When both conditions are satisfied, a tapered key 26 is pressed into the keyway in the throttle shaft, thereby rotationally locking the hub to the shaft and associating, unambiguously and without mechanical variance, a rotational position of the throttle shaft with an output signal from the position sensor. In such an application, the key lock has been found to be able to withstand a torque of up to at least 0.5 N-m without either axial or rotational slippage on the shaft. Preferably, the throttle shaft is configured so that in the finished assembly the keyway is disposed in the hub substantially 180° opposite from the attachment point of the sensor arm to the hub, as shown in FIG. 1, since the hub is drawn snugly against the shaft at that point by the action of the key in the keyway.

Referring to FIG. 3, in an alternative embodiment of the invention, a keyway 16' may be provided in the hub 20' instead of in the shaft 12', as in FIG. 1. In this embodiment, the key is inverted prior to insertion into the keyway and incises the shaft to secure the hub thereto. Note that optimally the key is harder than the shaft. In practice, this may be difficult to provide, since shafts capable of sustaining torque loads typically are formed of hard materials such as steel or aluminum; hence, a suitable key could be quite expensive. The alternative embodiment shown in FIG. 3 is not presently preferred.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. Apparatus for securing a hub to a shaft, comprising:
    a) a cylindrical shaft having at least one longitudinal keyway formed in an outer surface thereof, said at least one keyway having a bottom portion and at least two side walls;
    b) a hub having a cylindrical axial bore defining a wall in said hub and being disposable on said shaft to define a maximum distance from said keyway bottom portion to said bore wall, said wall being cylindrical about the entire surface of said axial bore, the entire surface of the axial bore being defined at a constant radial distance from a central axis of the axial bore; and
    c) at least one tapered locking key for insertion into said at least one keyway between said keyway bottom portion and said bore wall, said key having a pre-insertion maximum height greater than said maximum distance such that at least one of said key and said hub is deformed by said insertion, whereby said hub is rotationally and axially secured onto said shaft.

2. An apparatus in accordance with claim 1 wherein said hub is formed of a deformable polymer having a first hardness.

3. An apparatus in accordance with claim 2 wherein said key is formed of a material selected from the group consisting of metal, mineral-filled polymer, glass, ceramic, and combinations thereof.

4. An apparatus in accordance with claim 2 wherein said key has a second hardness greater than said first hardness.

5. An apparatus in accordance with claim 1 wherein said at least one locking key is an end key in a chain of connected keys, said end key being severable from said chain after insertion of said at least one key into said at least one keyway.

6. An apparatus in accordance with claim 1 wherein said shaft is a throttle shaft and said hub is a portion of a shaft rotary position sensor.

7. An apparatus in accordance with claim 1 wherein said at least one locking key is longitudinally tapered.

8. A method for securing a hub having a cylindrical axial bore defined by a bore wall onto a cylindrical shaft, said bore wall being cylindrical about the entire surface of said axial bore, the method comprising the steps of:

a) providing at least one longitudinal keyway in said shaft, said at least one keyway having a bottom portion and at least two side walls, said shaft having a solid cross-section along the entire length of said shaft;

b) disposing said entirely cylindrical axial bore of said hub onto said shaft to define a maximum distance between said keyway bottom portion and said bore wall, the entire surface of the axial bore being defined at a constant radial distance from a central axis of the axial bore;

c) providing at least one wedging means; and d) inserting said at least one wedging means into said at least one keyway between said keyway bottom portion and said bore wall.

9. A method in accordance with claim 8 wherein said at least one wedging means is at least one locking key having a maximum height greater than said maximum distance.

10. A method in accordance with claim 9 further comprising the step of advancing said at least one locking key into said at least one keyway until the point of said maximum height is axially centered within said hub bore.

11. Apparatus for securing a hub to a shaft, comprising:

a) a shaft having an entirely cylindrical outer surface;

b) a hub having an axial bore defining a wall in said hub and having at least one longitudinal keyway formed in an inner surface thereof, said at least one keyway having a bottom portion, said hub being disposable on said shaft to define a maximum distance from said keyway bottom portion to said outer surface, said axial bore having an axis; and c) at least one locking key for insertion into said at least one keyway between said keyway bottom portion and said shaft surface, said at least one key having a pre-insertion maximum radial height greater than said maximum distance such that at least one of said key and said shaft is deformed by said insertion, said radial height of said at least one locking key being tapered along a longitudinal axis of said at least one locking key, wherein said longitudinal axis is parallel with said axis of said axial bore, and whereby said hub is rotationally and axially secured onto said shaft.

* * * * *